US012698063B2

(12) United States Patent
Zhou et al.

(10) Patent No.: US 12,698,063 B2
(45) Date of Patent: Aug. 4, 2026

(54) FLOATING COLUMN SPOILER STRUCTURE, FLOATING COLUMN, AND FLOATING WIND TURBINE

(71) Applicant: HUANENG CLEAN ENERGY RESEARCH INSTITUTE, Beijing (CN)

(72) Inventors: Yiming Zhou, Beijing (CN); Xin Liu, Beijing (CN); Yutong Guo, Beijing (CN); Jianjun Chen, Beijing (CN); Xiaohui Guo, Beijing (CN)

(73) Assignee: HUANENG CLEAN ENERGY RESEARCH INSTITUTE, Beijing (CN)

( * ) Notice: Subject to any disclaimer, the term of this patent is extended or adjusted under 35 U.S.C. 154(b) by 80 days.

(21) Appl. No.: 18/834,648

(22) PCT Filed: Jan. 17, 2023

(86) PCT No.: PCT/CN2023/072524
§ 371 (c)(1),
(2) Date: Jul. 31, 2024

(87) PCT Pub. No.: WO2024/011884
PCT Pub. Date: Jan. 18, 2024

(65) Prior Publication Data
US 2025/0128796 A1      Apr. 24, 2025

(30) Foreign Application Priority Data
Jul. 11, 2022     (CN) .......................... 202210808636.3

(51) Int. Cl.
B63B 39/06          (2006.01)
F03D 13/25          (2016.01)

(52) U.S. Cl.
CPC ............ *B63B 39/06* (2013.01); *F03D 13/256* (2023.08); *F05B 2240/93* (2013.01); *F05B 2240/95* (2013.01)

(58) Field of Classification Search
CPC .... B63B 39/06; F03D 13/256; F05B 2240/93; F05B 2240/95
See application file for complete search history.

(56) References Cited

U.S. PATENT DOCUMENTS

2005/0201832 A1      9/2005   Edfeldt

FOREIGN PATENT DOCUMENTS

CN          102720209 A       10/2012
CN          112519952 A       3/2021
(Continued)

*Primary Examiner* — William C Joyce
(74) *Attorney, Agent, or Firm* — Ming Jiang; OPENPTO US LLC

(57) ABSTRACT

A floating column spoiler structure, a floating column and a floating wind turbine are provided. The floating column spoiler structure includes multiple spoiler plates and lifting and unfolding assemblies connecting each of the spoiler plates and a column. Each of the lifting and unfolding assemblies includes a first connecting rod, a second connecting rod, a first gear and a second gear; a first end of the first connecting rod is rotatably connected with a first end of the second connecting rod, and each of the spoiler plates is arranged at the first end of the first connecting rod and the first end of the second connecting rod; a second end of the first connecting rod is rotatably connected with the first gear, and a second end of the second connecting rod is rotatably connected with the second gear.

16 Claims, 9 Drawing Sheets

(56)     References Cited

FOREIGN PATENT DOCUMENTS

| | | | | | | |
|----|------------|----|---|---------|----------|-----------|
| CN | 112744337  | A  | * | 5/2021  | ............. | B63B 39/02 |
| CN | 114526201  | A  |   | 5/2022  |          |           |
| CN | 114987692  | A  | * | 9/2022  | ............. | G01C 13/00 |
| CN | 115092336  | A  |   | 9/2022  |          |           |
| CN | 217456290  | U  |   | 9/2022  |          |           |
| CN | 118579224  | A  | * | 9/2024  | ............. | B63B 17/00 |
| EP | 3756981    | A1 |   | 12/2020 |          |           |

* cited by examiner

FLOATING COLUMN SPOILER STRUCTURE, FLOATING COLUMN, AND FLOATING WIND TURBINE

CROSS-REFERENCE TO RELATED APPLICATIONS

This application is a continuation of PCT/CN2023/072524, filed Jan. 17, 2023 and claims priority of Chinese Patent Application No. CN202210808636.3, filed on Jul. 11, 2022, the contents of which are hereby incorporated by reference.

TECHNICAL FIELD

The disclosure relates to the technical field of spoiler structures, in particular to a floating column spoiler structure, a floating column, and a floating wind turbine.

BACKGROUND

At present, offshore wind turbine is usually equipped with floating platform to support floating wind turbine, and the bottom of the floating platform is usually equipped with cylindrical floating column. When the ocean current flows through the floating column, karman vortex bits often occur around the floating column, which causes vortex-induced vibration of the floating column, leading to the phenomenon that the floating wind turbine often have too large inclination angle or too large roll and pitch angle, which reduces the stability of the floating wind turbine and affects the smooth power output of the floating wind turbine.

Therefore, how to improve the stability of floating wind turbine is a technical problem that needs to be solved by those skilled in this field at present.

SUMMARY

In view of this, the purpose of the disclosure is to provide a floating column spoiler structure to improve the stability of a floating wind turbine.

In order to achieve the above purpose, the disclosure provides the following technical scheme:

a floating column spoiler structure is provided, which includes:

multiple spoiler plates;

lifting and unfolding assemblies connecting each of the spoiler plates and a column; where each of the lifting and unfolding assemblies includes a first connecting rod, a second connecting rod, a first gear and a second gear; a first end of the first connecting rod is rotatably connected with a first end of the second connecting rod, and each of the spoiler plates is arranged at the first end of the first connecting rod and the first end of the second connecting rod; a second end of the first connecting rod is rotatably connected with the first gear, and a second end of the second connecting rod is rotatably connected with the second gear; the first gear and the second gear are sequentially arranged on an outer circumferential wall of the column from top to bottom along an axial direction of the column, and the outer circumferential wall of the column is provided with lifting gear teeth being capable of meshing with the first gear and the second gear.

Optionally, in the floating column spoiler structure, each of the spoiler plates is rotatably arranged at the first end of the first connecting rod and the first end of the second connecting rod.

Optionally, in the floating column spoiler structure, the first end of the first connecting rod and the first end of the second connecting rod are connected by a ball hinge.

Optionally, in the floating column spoiler structure, each of the spoiler plates includes spoiler nets or spoiler nails.

Optionally, in the floating column spoiler structure, a number of the lifting and unfolding assemblies corresponding to each of the spoiler plates is three, and the lifting and unfolding assemblies includes a first lifting and unfolding assembly, a second lifting and unfolding assembly and a third lifting and unfolding assembly, and connection positions of the first lifting and unfolding assembly, the second lifting and unfolding assembly and the third lifting and unfolding assembly with corresponding one of the spoiler plates are distributed in a triangle shape.

Optionally, in the floating column spoiler structure, the lifting gear teeth are directly arranged on the outer circumferential wall of the column, or toothed belts are arranged on the outer circumferential wall of the column, and the lifting gear teeth are located on the toothed belts.

Optionally, in the floating column spoiler structure, the first gear and the second gear are respectively arranged on the outer circumferential wall of the column through a first gear mounting piece and a second gear mounting piece, and the first gear mounting piece and the second gear mounting piece are slidably connected to the outer circumferential wall of the column.

Optionally, in the floating column spoiler structure, further including a central control system, a water body flow velocity monitoring system and a wind and wave environment monitoring system, as well as a first pushing piece for pushing the second end of the first connecting rod to lift and a second pushing piece for pushing the second end of the second connecting rod to lift, where the central control system is capable of transmitting signals with the water body flow velocity monitoring system, the wind and wave environment monitoring system, the first pushing piece and the second pushing piece.

A floating column, including a floating column spoiler structure as described above.

A floating wind turbine, including a floating column spoiler structure as described above.

When the floating column spoiler structure provided by this disclosure is used, because the first end of the first connecting rod and the first end of the second connecting rod are rotatably connected, the second end of the first connecting rod is rotatably connected with the first gear and the second end of the second connecting rod is rotatably connected with the second gear, which are sequentially arranged on the outer circumferential wall of the column from top to bottom along the axial direction of the column, and the outer circumferential wall of the column is provided with lifting gear teeth capable of meshing with the first gear and the second gear; Therefore, the distance between the first gear and the second gear can be adjusted by moving at least one of the first gear and the second gear along the axial direction of the column, so that the distance between the second end of the first connecting rod and the second end of the second connecting rod can be adjusted, so that the distance between the first end of the first connecting rod and the first end of the second connecting rod and the outer circumferential wall of the column can be adjusted, and the distance between the spoiler arranged at the first end of the first connecting rod and the first end of the second connecting rod and the outer circumferential wall of the column can be increased or decreased. Therefore, the floating column spoiler structure provided by the invention has the following beneficial effects.

When the floating column spoiler structure provided by this disclosure is used, because the first end of the first connecting rod and the first end of the second connecting rod are rotatably connected, the second end of the first connecting rod is rotatably connected with the first gear and the second end of the second connecting rod is rotatably connected with the second gear, the first gear and the second gear are sequentially arranged on an outer circumferential wall of the column from top to bottom along an axial direction of the column, and the outer circumferential wall of the column is provided with lifting gear teeth being capable of meshing with the first gear and the second gear. Therefore, the distance between the first gear and the second gear can be adjusted by moving at least one of the first gear and the second gear along the axial direction of the column, so that the distance between the second end of the first connecting rod and the second end of the second connecting rod can be adjusted, so that the distance between the first end of the first connecting rod and the first end of the second connecting rod and the outer circumferential wall of the column can be adjusted, so that the distance between the spoiler plate arranged at the first end of the first connecting rod and the first end of the second connecting rod and the outer circumferential wall of the column can be increased or decreased. Therefore, the floating column spoiler structure provided by the disclosure has the following beneficial effects:

1. when the seawater velocity is high, at least one of the first gear and the second gear is first moved to reduce the distance between the first end of the first connecting rod and the first end of the second connecting rod and the column, and the spoiler plate is retracted, and then both the first gear and the second gear are raised along the lifting gear teeth, so that multiple spoiler plates are raised to a preset spoiler position, and then at least one of the first gear and the second gear is moved. The distance between the first end of the first connecting rod and the first end of the second connecting rod and the outer circumferential wall of the column is increased, so that the distance between the spoiler plate and the outer circumferential wall of the column is increased, and the unfolding function of the spoiler plate is realized; the karman vortex bits around the column are reduced through multiple unfolded spoiler plates, so that the vortex-induced vibration of the column is reduced, thereby reducing the inclination angle, the rolling angle and the pitching angle of the floating wind turbine, improving the stability of the floating wind turbine and enabling the power of the floating wind turbine to be stably output;

2. when the wind and waves are heavy, firstly, by moving at least one of the first gear and the second gear, the distances between the first end of the first connecting rod and the first end of the second connecting rod and the column are reduced, and the spoiler plates are retracted; then, both the first gear and the second gear are lowered along the lifting gear teeth, so that multiple spoiler plates are lowered to preset sagging positions, and the center of gravity of the floating column is lowered, so that the center of gravity of the whole floating platform is lowered; and then, at least one of the first gear and the second gear is moved, the distance between the first end of the first connecting rod and the first end of the second connecting rod and the outer circumferential wall of the column is increased, so that the distance between the spoiler plate and the outer circumferential wall of the column is increased, the spoiler plate is unfolded at a preset sagging position, the damping of the floating column is increased, the stability of the whole floating wind turbine is improved, and the power of the floating wind turbine is stably output;

3. when in a calm sea, at least one of the first gear and the second gear is moved to reduce the distance between the first end of the first connecting rod and the first end of the second connecting rod and the outer circumferential wall of the column, thereby reducing the distance between the spoiler plate and the outer circumferential wall of the column, and the spoiler plate is retracted to reduce the hydrodynamic force.

BRIEF DESCRIPTION OF THE DRAWINGS

In order to more clearly explain the embodiment of the disclosure or the technical scheme in the prior art, the drawings needed to be used in the description of the embodiment or the prior art will be briefly introduced below. Obviously, the drawings in the following description are only some embodiments of the disclosure, and for ordinary skilled in this field, other drawings can be obtained according to these drawings without creative efforts.

LIST OF REFERENCE CHARACTERS

Figure 1:
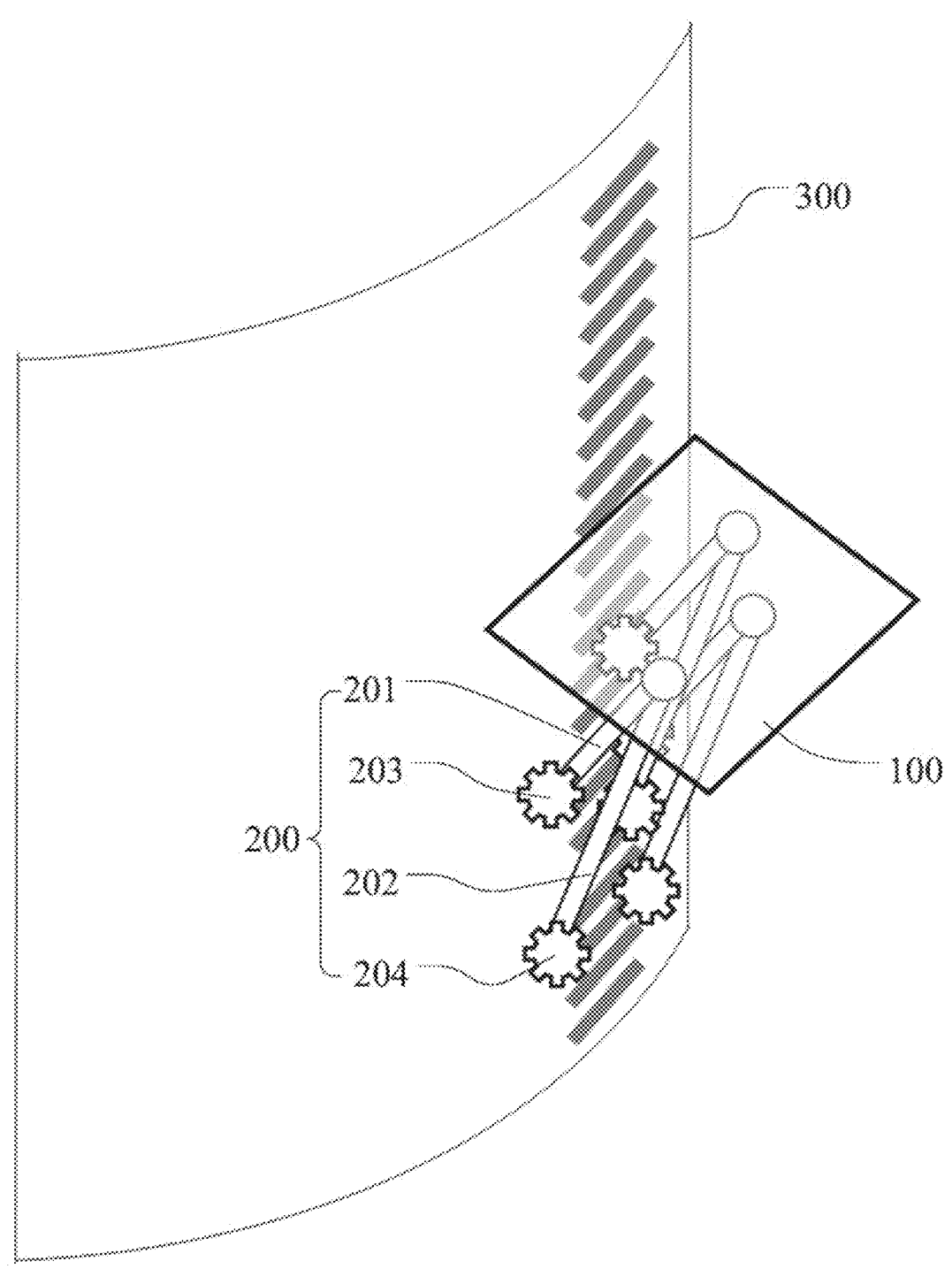
FIG. 1 is a schematic structural diagram of a floating column spoiler structure when unfolded according to an embodiment of the disclosure.

100 spoiler plate; 200 lifting and unfolding assembly; 201 first connecting rod; 202 second connecting rod; 203 first gear; 204 second gear; 300 column; 301 toothed belt; and 400 anchoring system.

DETAILED DESCRIPTION OF THE EMBODIMENTS

In view of this, the core of this disclosure is to provide a floating column spoiler structure to improve the stability of floating wind turbine.

In the following, the technical scheme in the embodiment of the disclosure will be clearly and completely described with reference to the attached drawings. Obviously, the described embodiment is only a part of the embodiment of the disclosure, but not all of the embodiments. Based on the embodiments in this disclosure, all other embodiments obtained by ordinary skilled in this field without creative efforts belong to the scope of protection in this disclosure.

As shown in FIGS. 1 to 9, an embodiment of the disclosure discloses a floating column spoiler structure, which includes spoiler plates 100 and lifting and unfolding assemblies 200.

Among them, multiple spoiler plates 100 is provided, and the lifting and unfolding assembly 200 connects the spoiler plate 100 and the column 300. The lifting and unfolding assembly 200 includes a first connecting rod 201, a second connecting rod 202, a first gear 203 and a second gear 204, and the first end of the first connecting rod 201 is rotatably connected with the first end of the second connecting rod 202, and the spoiler plate 100 is arranged at the first end of the first connecting rod 201 and the first end of the second connecting rod 202. The second end of the first connecting rod 201 is rotatably connected with the first gear 203, and the second end of the second connecting rod 202 is rotatably connected with the second gear 204. The first gear 203 and the second gear 204 are sequentially arranged on the outer circumferential wall of the column 300 from top to bottom along the axial direction of the column 300, and the outer circumferential wall of the column 300 is provided with lifting gear teeth that can mesh with the first gear 203 and the second gear 204.

When the floating column spoiler structure provided by this disclosure is used, because the first end of the first connecting rod 201 and the first end of the second connecting rod 202 are rotatably connected, the second end of the first connecting rod 201 is rotatably connected with the first gear 203, and the second end of the second connecting rod 202 is rotatably connected with the second gear 204, the first gear 203 and the second gear 204 are sequentially arranged on the outer circumferential wall of the column 300 from top to bottom along the axial direction of the column 300, and the outer circumferential wall of the column 300 is provided with lifting gear teeth capable of meshing with the first gear 203 and the second gear 204; therefore, the distance between the first gear 203 and the second gear 204 can be adjusted by moving at least one of the first gear 203 and the second gear 204 along the axial direction of the column 300, so that the distance between the second end of the first connecting rod 201 and the second end of the second connecting rod 202 can be adjusted, so that the distance between the first end of the first connecting rod 201 and the first end of the second connecting rod 202 and the outer circumferential wall of the column 300 can be adjusted, and the distance between the spoiler plate 100 arranged at the first end of the first connecting rod 201 and the first end of the second connecting rod 202 and the outer circumferential wall of the column 300 can be increased or decreased. Therefore, the floating column spoiler structure provided by the disclosure has the following beneficial effects:

1. when the seawater velocity is high, at least one of the first gear 203 and the second gear 204 is first moved to reduce the distance between the first end of the first connecting rod 201 and the first end of the second connecting rod 202 and the column 300, and the spoiler plate 300 is retracted, and then both the first gear 203 and the second gear 204 are raised along the lifting gear teeth, so that multiple spoiler plates 100 are raised to a preset spoiler position, and then at least one of the first gear 203 and the second gear 204 is moved. The distance between the first end of the first connecting rod 201 and the first end of the second connecting rod 202 and the outer circumferential wall of the column 300 is increased, so that the distance between the spoiler plate 100 and the outer circumferential wall of the column 300 is increased, and the unfolding function of the spoiler plate 100 is realized; the karman vortex bits around the column 300 are reduced through multiple unfolded spoiler plates 100, so that the vortex-induced vibration of the column 300 is reduced, thereby reducing the inclination angle, the rolling angle and the pitching angle of the floating wind turbine, improving the stability of the floating wind turbine and enabling the power of the floating wind turbine to be stably output;

2. when the wind and waves are heavy, firstly, by moving at least one of the first gear 203 and the second gear 204, the distances between the first end of the first connecting rod 201 and the first end of the second connecting rod 202 and the column 300 are reduced, and the spoiler plates 100 are retracted; then, both the first gear 203 and the second gear 204 are lowered along the lifting gear teeth, so that multiple spoiler plates 100 are lowered to preset sagging positions, and the center of gravity of the floating column is lowered, so that the center of gravity of the whole floating platform is lowered; and then, at least one of the first gear 203 and the second gear 204 is moved, the distance between the first end of the first connecting rod 201 and the first end of the second connecting rod 202 and the outer circumferential wall of the column 300 is increased, so that the distance between the spoiler plate 100 and the outer circumferential wall of the column 300 is increased, the spoiler plate 100 is unfolded at a preset sagging position, the damping of the floating column is increased, the stability of the whole floating wind turbine is improved, and the power of the floating wind turbine is stably output;

3. when in a calm sea, at least one of the first gear 203 and the second gear 204 is moved to reduce the distance between the first end of the first connecting rod 201 and the first end of the second connecting rod 202 and the outer circumferential wall of the column 300, thereby reducing the distance between the spoiler plate 100 and the outer circumferential wall of the column 300, and the spoiler plate 100 is retracted to reduce the hydrodynamic force.

It should be understood that the first connecting rod, the second connecting rod and the column section between the first gear 203 and the second gear 204 form a triangular structure, and the height of the triangular structure is the distance between the spoiler plate 100 and the column 300 if the column section between the first gear 203 and the second gear 204 is the bottom of the triangular structure. When the triangular structure is a right triangle, the distance between the spoiler 100 and the column 300 is the largest; when the triangular structure is an obtuse triangle, increasing the distance between the first gear 203 and the second gear 204 can increase the distance between the spoiler plate 100 and the column 300; when the triangular structure is an acute triangle, reducing the distance between the first gear 203 and the second gear 204 can increase the distance between the spoiler plate 100 and the column 300. Therefore, when the spoiler 100 needs to be unfolded, the distance between the first gear 203 and the second gear 204 can be increased, or the distance between the first gear 203 and the second gear 204 can be decreased, as long as the spoiler plate 100 can be unfolded.

In addition, the spoiler plate 100 can be fixedly arranged at the first end of the first connecting rod 201 and the first end of the second connecting rod 202 by means of bolt connection or rivet connection, and can also be rotatably arranged at the first end of the first connecting rod 201 and the first end of the second connecting rod 202 by means of universal joint bearing or ball hinge, so long as the connection mode can meet the use requirements, it is within the protection scope of the disclosure. Optionally, the spoiler plate 100 provided by the embodiment of the disclosure is rotatably arranged at the first end of the first connecting rod 201 and the first end of the second connecting rod 202, so that when the spoiler 100 is retracted, the spoiler plate 100 can be rotated to be attached to the outer circumferential wall of the column 300, and when the spoiler 100 is unfolded, the spoiler plate 100 can be rotated to form a preset inclination angle with the horizontal plane, so that the angle adjustment of the spoiler plate 100 is more flexible.

Figure 2:
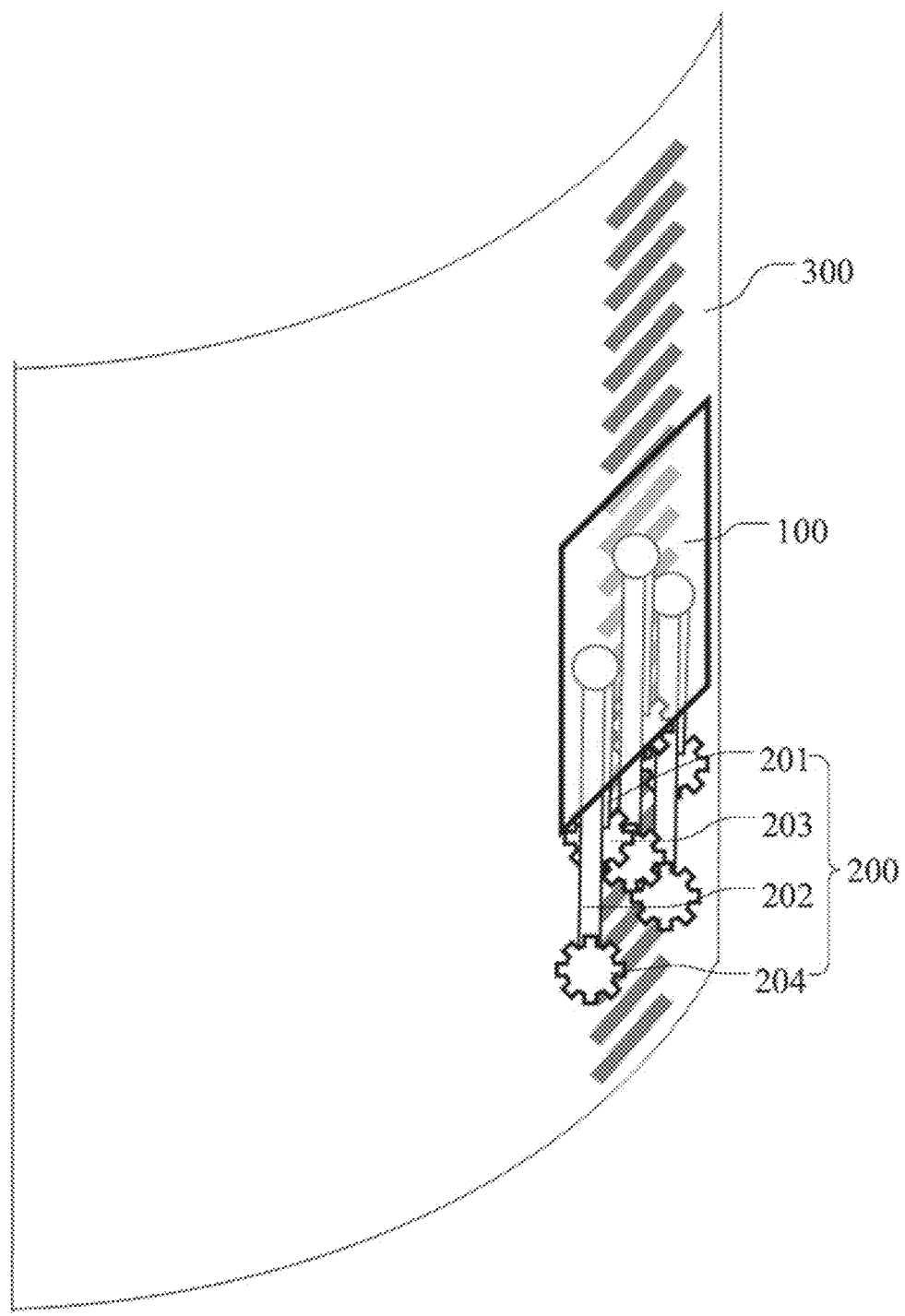
FIG. 2 is a schematic structural diagram of the floating column spoiler structure when retracted according to an embodiment of the disclosure.
Figure 3:
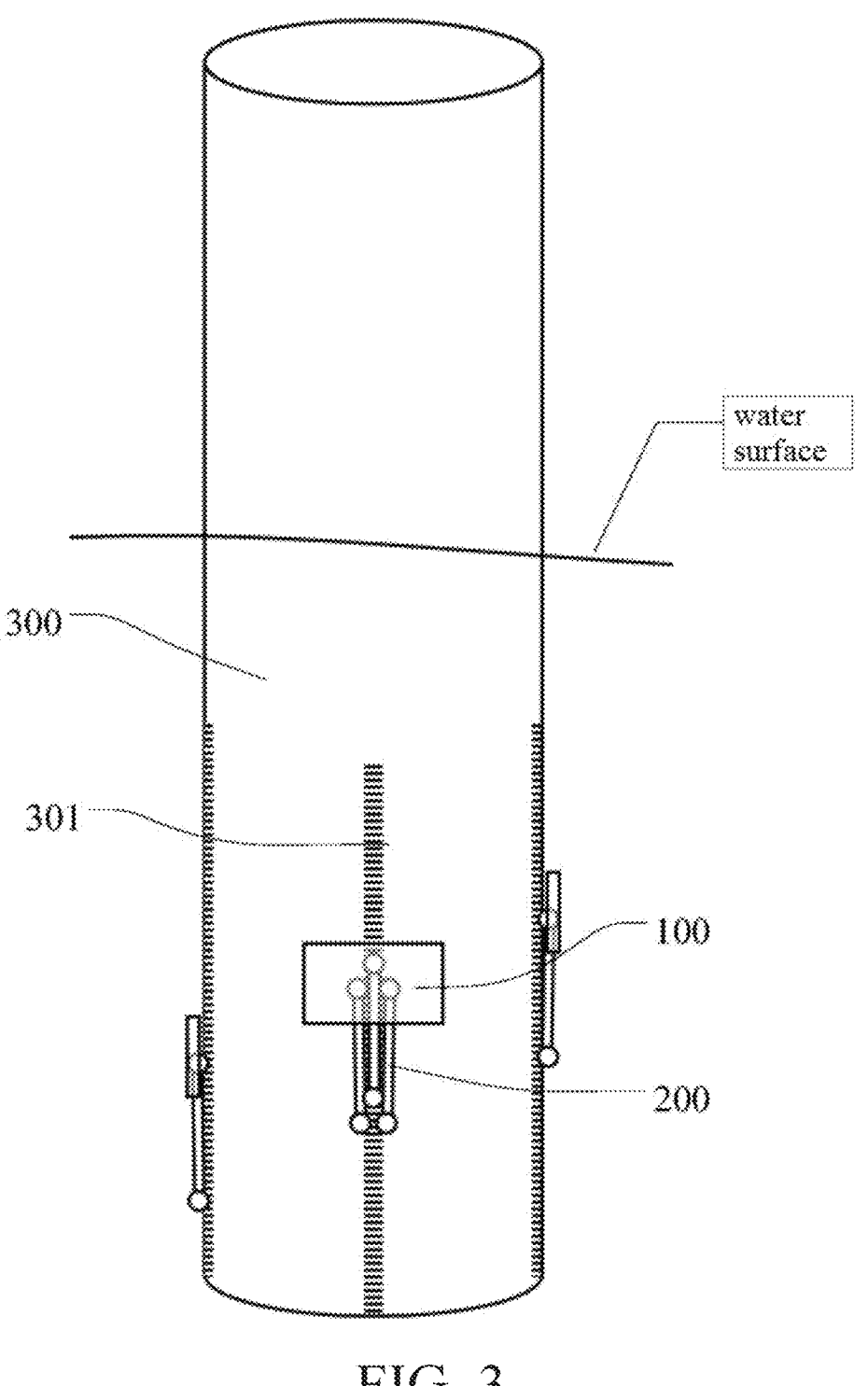
FIG. 3 is a schematic structural diagram of the floating column spoiler structure when it rises to the preset spoiler position and the spoiler plate is retracted according to an embodiment of the disclosure.
Figure 4:
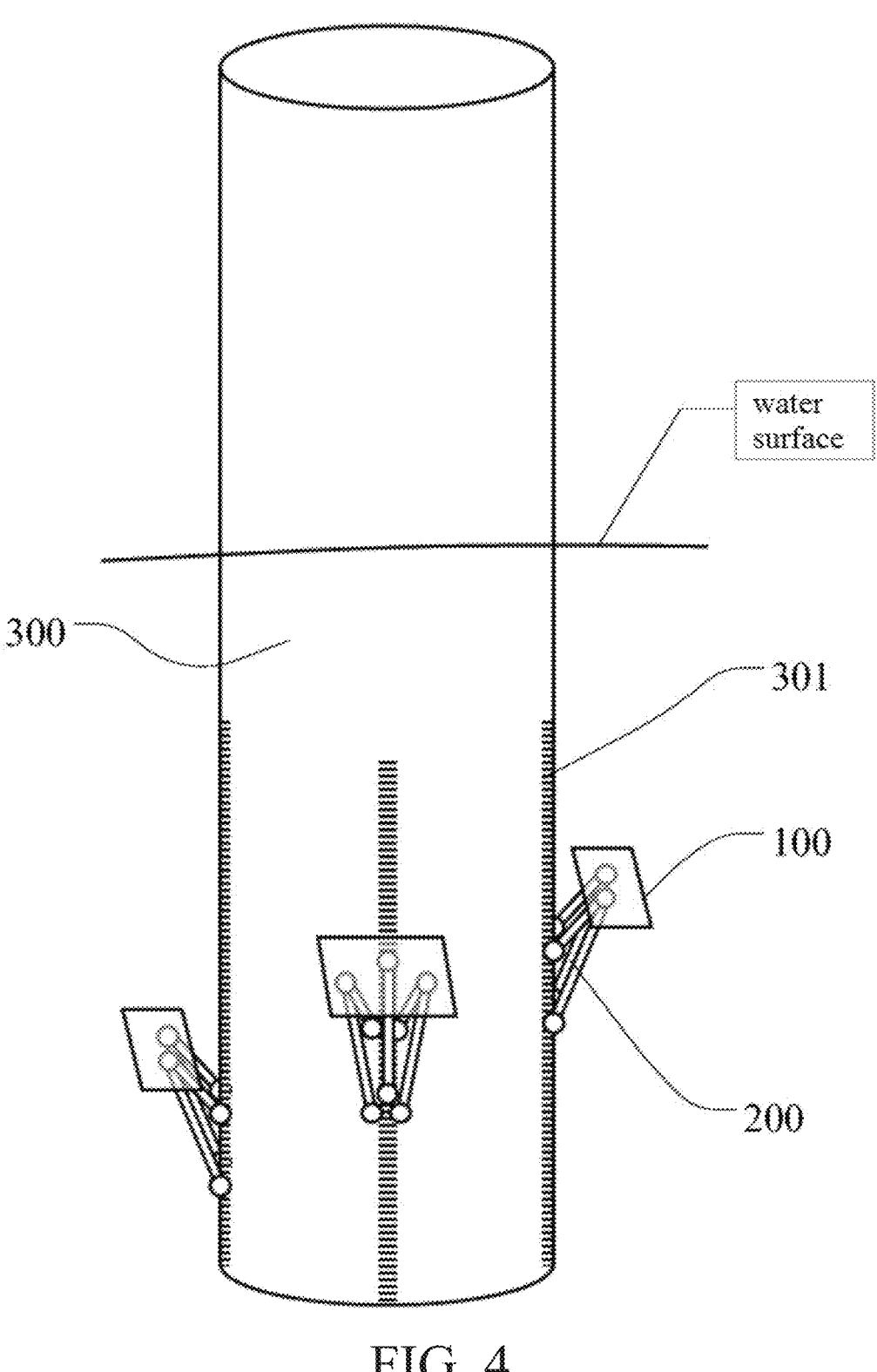
FIG. 4 is a schematic structural diagram of the floating column spoiler structure when it rises to the preset spoiler position and the spoiler plate is unfolded according to an embodiment of the disclosure.
Figure 5:
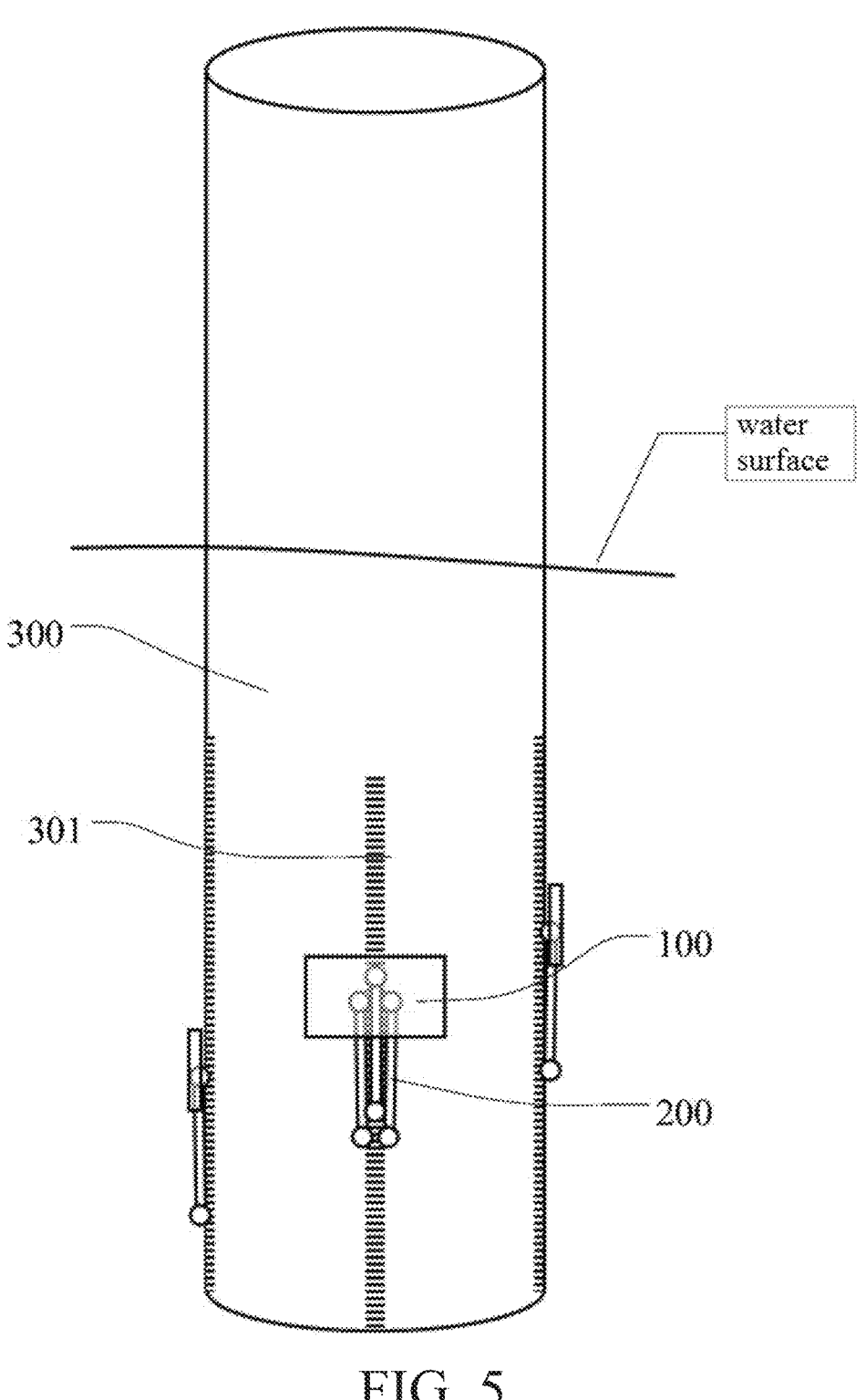
FIG. 5 is a schematic structural diagram of the floating column spoiler structure when the spoiler plate is retracted before descending according to an embodiment of the disclosure.
Figure 6:
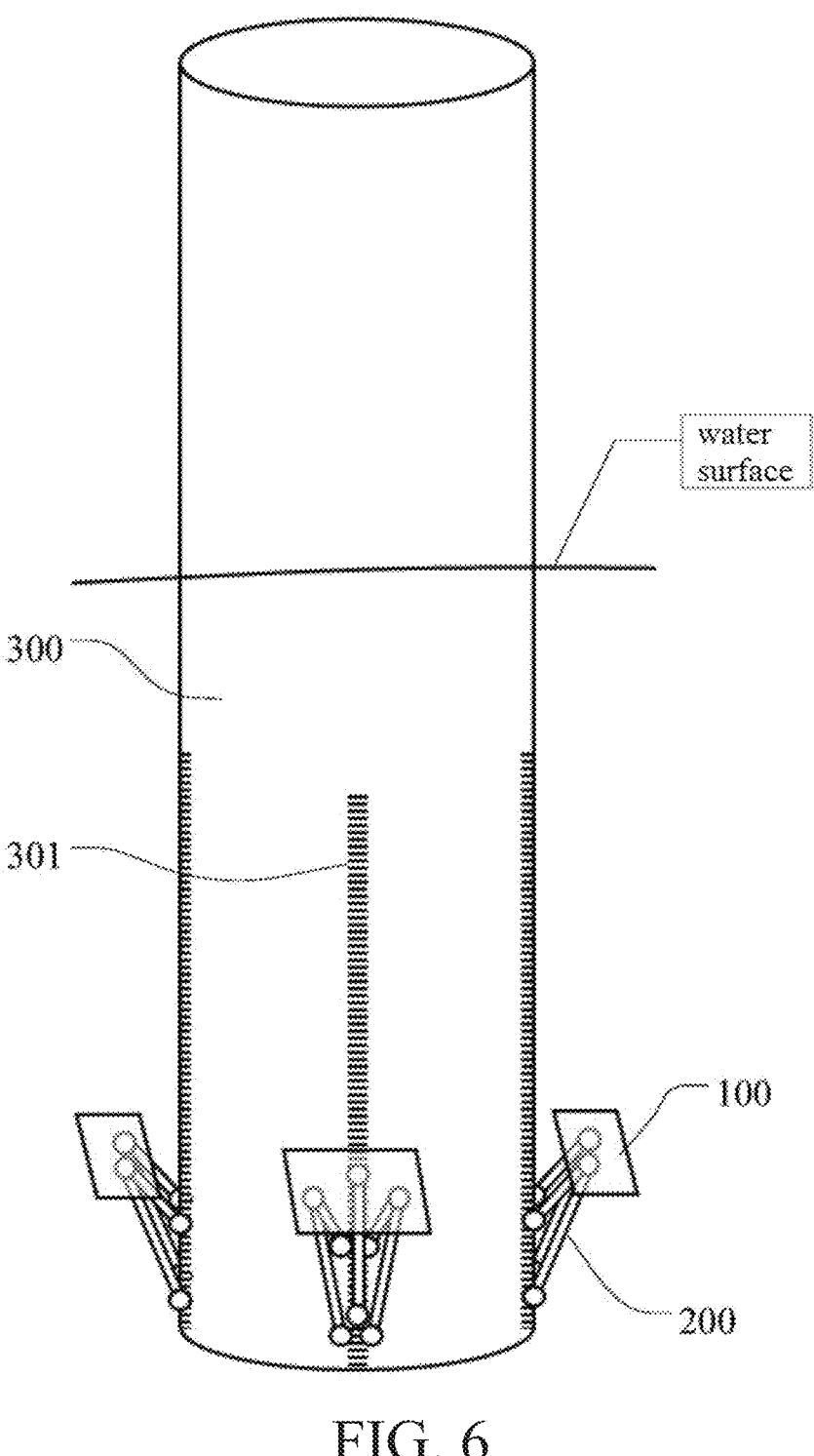
FIG. 6 is a schematic structural diagram of the floating column spoiler structure when it descends to a preset sagging position and the spoiler plate is unfolded according to an embodiment of the disclosure.

As shown in FIGS. 1 and 2, the first end of the first connecting rod 201 and the first end of the second connecting rod 202 are connected by a ball hinge to realize the rotational connection between the first end of the first connecting rod 201 and the first end of the second connecting rod 202, which is convenient for adjusting the distance between the second end of the first connecting rod 201 and the second end of the second connecting rod 202, thus realizing the unfolding and retraction of the spoiler plate 100.

Figure 7:
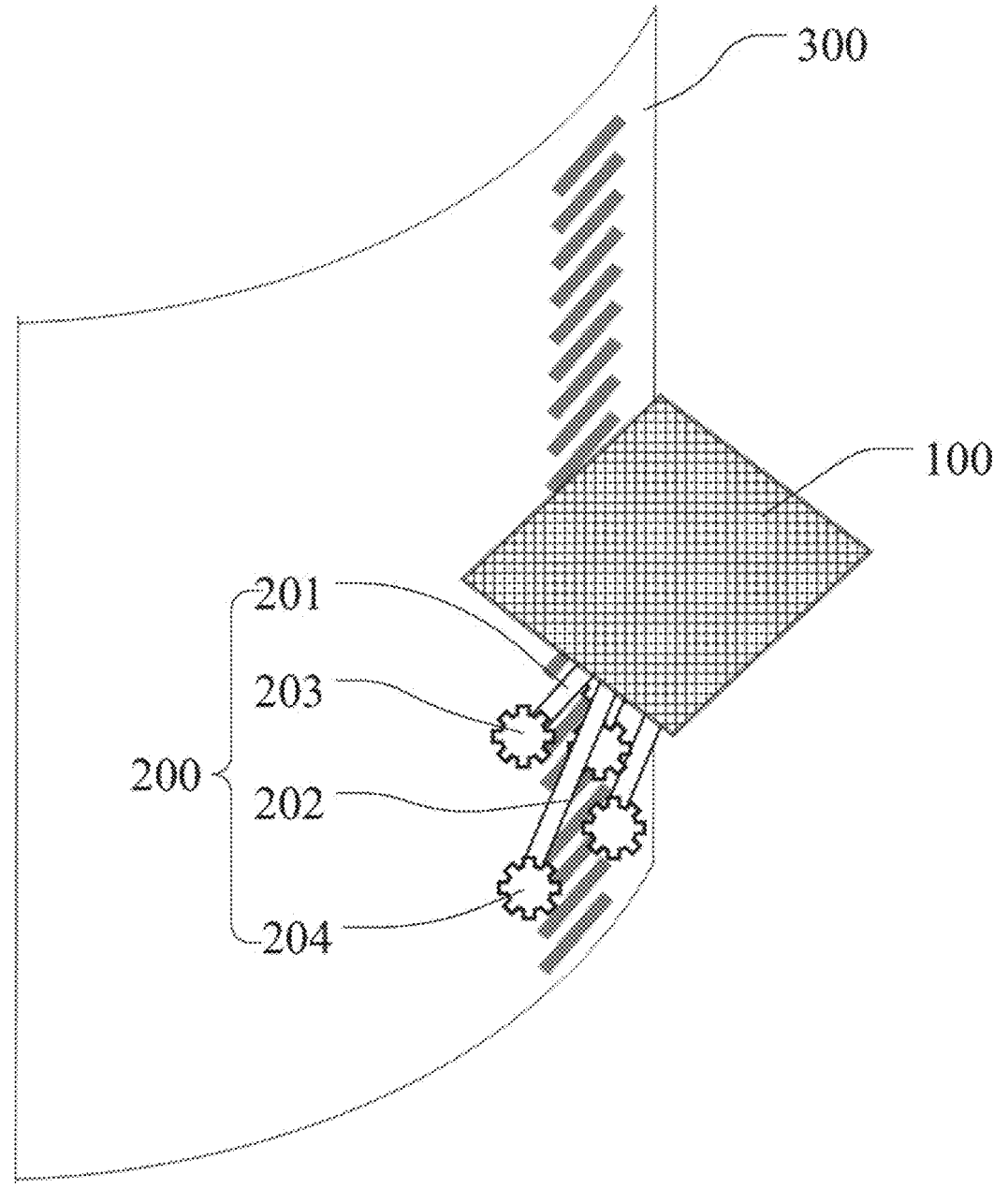
FIG. 7 is a schematic structural diagram of the floating column spoiler structure with spoiler nets according to an embodiment of the disclosure.
Figure 8:
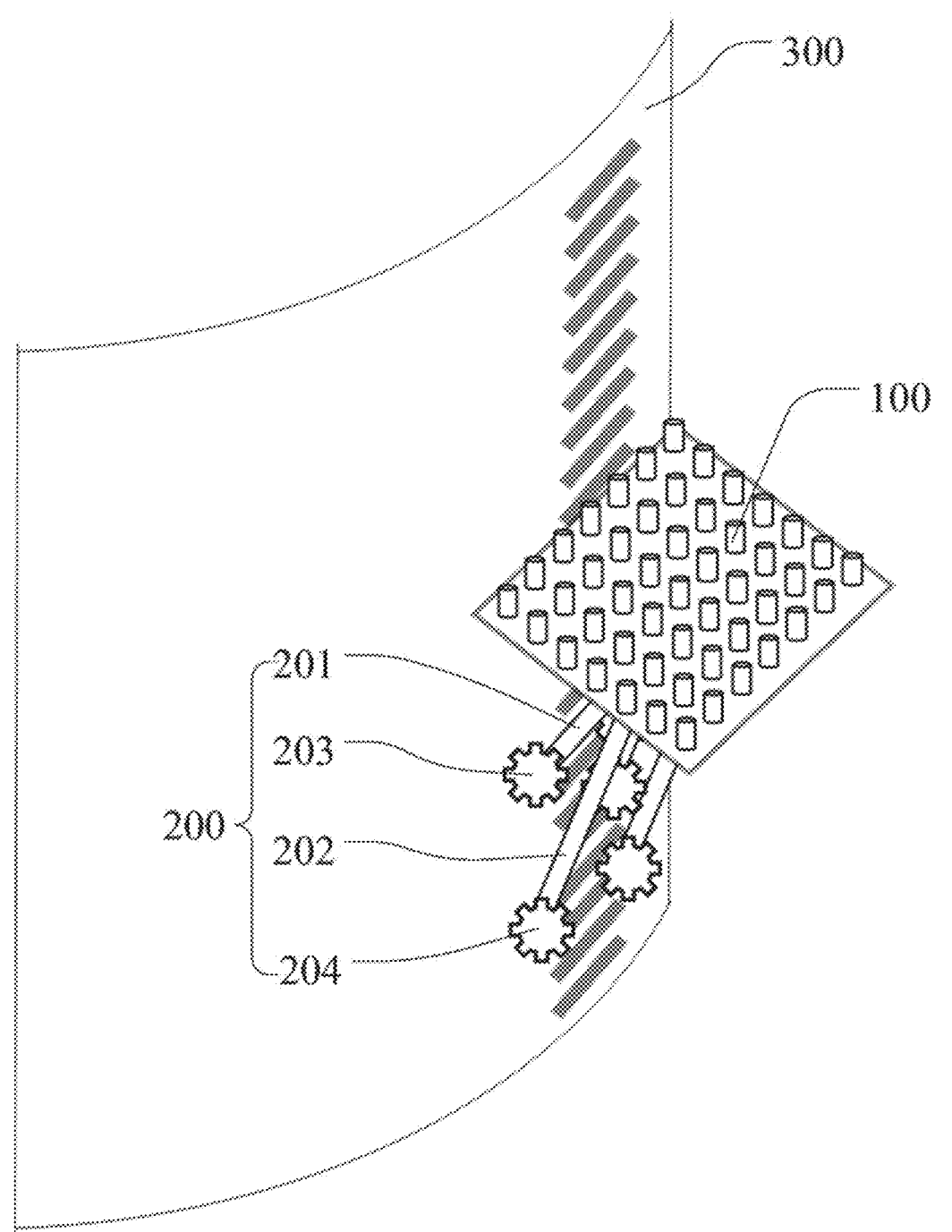
FIG. 8 is a schematic structural diagram of the floating column spoiler structure with spoiler nails according to an embodiment of the disclosure.

It should be noted that the spoiler plate 100 can be a spoiler net, a plate with spoiler nails, a spoiler plate with spoiler blades, etc., as long as it is a structural that can meet the spoiler requirements, it belongs to the protection scope of the disclosure. Optionally, as shown in FIG. 7, in one embodiment of the disclosure, the spoiler plate 100 is a spoiler net to play a spoiler role through the mesh of the spoiler net. As shown in FIG. 8, in another embodiment of the disclosure, the spoiler plate 100 includes a spoiler plate body and spoiler nails arranged on the spoiler plate body to play a spoiler role through the raised spoiler nails.

In a specific embodiment of the disclosure, a number of the lifting and unfolding assemblies 200 corresponding to each of the spoiler plates 100 is three, and the lifting and unfolding assemblies 200 includes a first lifting and unfolding assembly, a second lifting and unfolding assembly and a third lifting and unfolding assembly, and connection positions of the first lifting and unfolding assembly, the second lifting and unfolding assembly and the third lifting and unfolding assembly with corresponding one of the spoiler plates 100 are distributed in a triangle shape, so as to form a triangular support structure for the spoiler plate 100 and improve the stability of the spoiler plate 100.

In addition, the lifting gear teeth can be directly arranged on the outer circumferential wall of the column 300, that is, the lifting gear teeth and the column 300 have an integrated structure. Alternatively, the outer circumferential wall of the column 300 is provided with toothed belts 301, and the lifting gear teeth are located on the toothed belts 301, that is, the column 300 and the toothed belts with a split structure are all within the protection scope of the disclosure as long as they can meet the use requirements.

Further, the first gear 203 and the second gear 204 are respectively arranged on the outer circumferential wall of the column 300 through the first gear 203 mounting piece and the second gear 204 mounting piece, and the first gear 203 mounting piece and the second gear 204 mounting piece are slidably connected to the outer circumferential wall of the column 300, so that the first gear 203 and the second gear 204 can be meshed and rolled on the lifting gear teeth, thereby adjusting and enabling the spoiler plate 100 to be lifted, unfolded and retracted.

In addition, the floating column turbulence structure provided by the disclosure also includes a central control system, a water body flow velocity monitoring system and a wind and wave environment monitoring system, as well as a first pushing piece for pushing the second end of the first connecting rod 201 to lift and a second pushing piece for pushing the second end of the second connecting rod 202 to lift, where the central control system is capable of transmitting signals with the water body flow velocity monitoring system, the wind and wave environment monitoring system, the first pushing piece and the second pushing piece. Seawater flow velocity information is monitored (including factors such as water flow velocity and direction) through a water body flow velocity monitoring system, and wave condition information is monitored (including factors such as wave height, period and wavelength) through a wind and wave environment monitoring system. After receiving seawater flow velocity information and wave condition information, the central control system estimates the movement situation of the floating column, and controls the first pushing piece and the second pushing piece to perform the pushing action according to the estimated movement situation of the floating column. The first pushing piece and the second pushing piece push the first connecting rod 201 and the second connecting rod 202 respectively, so that the height of the spoiler plate 100 can be adjusted and the state of the spoiler plate 100 can be switched between unfolding and retraction, so that the floating column spoiler structure can actively adjust the height and state of the spoiler plate 100 according to the water body flow rate and wind and wave environment, better reduce the vortex-induced vibration phenomenon, and improve the suppression effect on the rolling and pitching of the floating wind turbine, thereby improving the stability of the floating wind turbine and ensuring the stability of the floating wind turbine.

The signal transmission mode between the central control system, the water body flow velocity monitoring system, the wind and wave environment monitoring system, the first pushing piece and the second pushing piece can be wired transmission or wireless transmission, as long as it can meet the signal transmission requirements, it belongs to the protection scope of the disclosure.

In addition, the disclosure also provides a floating column and a floating wind turbine, both of which include the floating column spoiler structure, so that all the technical effects of the floating column spoiler structure are achieved, and the details are not repeated here.

Figure 9:
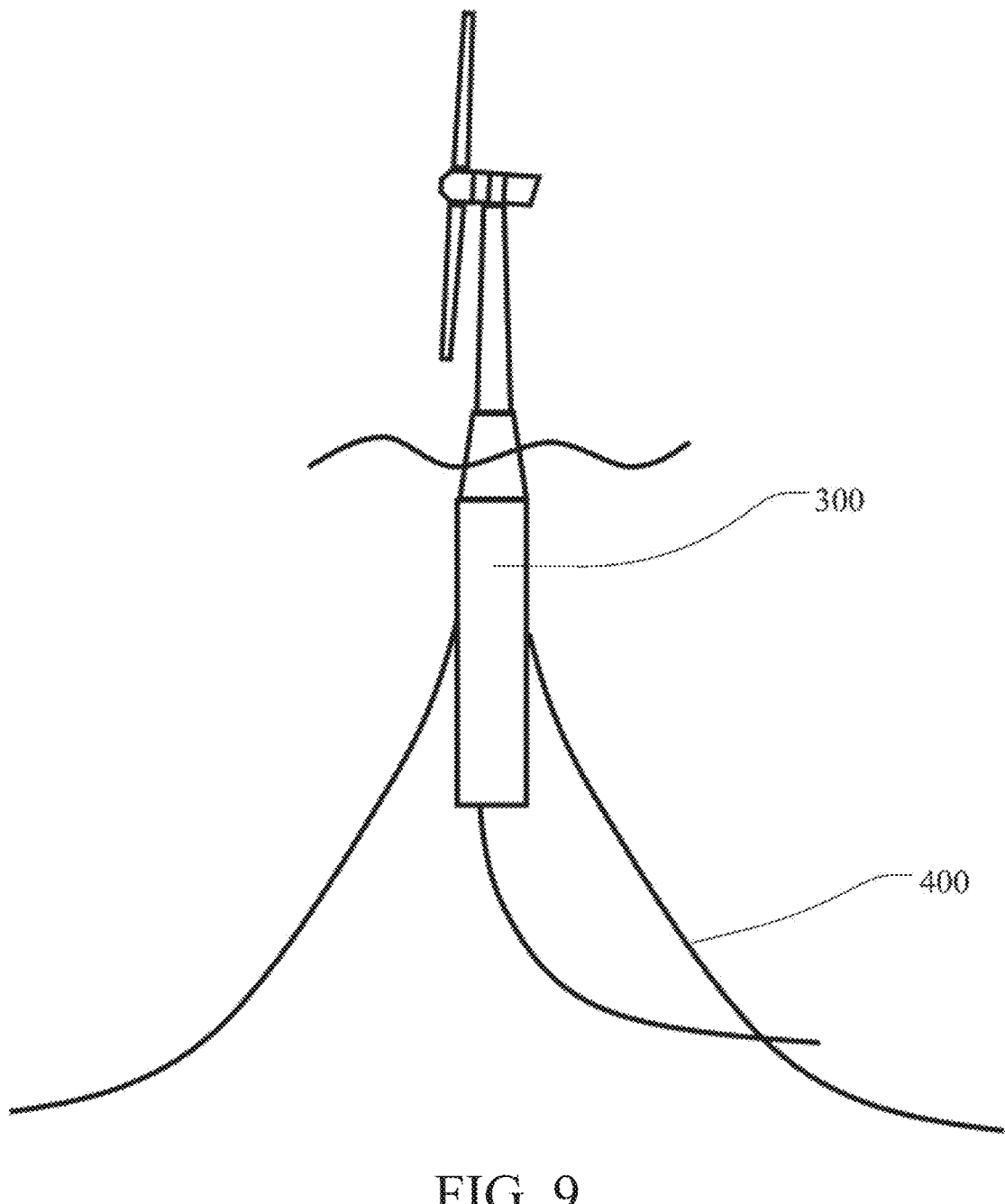
FIG. 9 is a schematic structural diagram of a floating wind turbine according to an embodiment of the disclosure.

In the floating wind turbine shown in FIG. 9, the anchor chain of the anchoring system 400 fixes the column 300 on the seabed to realize the positioning and fixing of the floating wind turbine, and the floating wind turbine is set in a preset sea area to generate electricity through offshore wind energy.

The terms "first" and "second" in the description and claims of the disclosure and the above drawings are used to distinguish different objects, not to describe a specific order.

Furthermore, the terms "including" and "have" and any variations thereof are intended to cover non-exclusive inclusion. For example, a process, method, system, product or equipment that includes a series of steps or units is not set in the listed steps or units, but may include steps or units that are not listed.

The above description of the disclosed embodiments enables those skilled in the art to make or use the disclosure. Many modifications to these embodiments will be obvious to those skilled in the art, and the general principles defined herein can be implemented in other embodiments without departing from the spirit or scope of the disclosure. Therefore, the disclosure is not to be limited to the embodiments shown herein, but is to be accorded the widest scope consistent with the principles and novel features disclosed herein.

What is claimed is:

1. A floating column spoiler structure, comprising:
a plurality of spoiler plates;
lifting and unfolding assemblies connecting each of the spoiler plates and a column; wherein each of the lifting and unfolding assemblies comprises a first connecting rod, a second connecting rod, a first gear and a second gear; a first end of the first connecting rod is rotatably connected with a first end of the second connecting rod, and each of the spoiler plates is arranged at the first end of the first connecting rod and the first end of the second connecting rod; a second end of the first connecting rod is rotatably connected with the first gear, and a second end of the second connecting rod is rotatably connected with the second gear; the first gear and the second gear are sequentially arranged on an outer circumferential wall of the column from top to bottom along an axial direction of the column, and the outer circumferential wall of the column is provided with lifting gear teeth being capable of meshing with the first gear and the second gear.

2. The floating column spoiler structure according to claim 1, wherein each of the spoiler plates is rotatably arranged at the first end of the first connecting rod and the first end of the second connecting rod.

3. The floating column spoiler structure according to claim 1, wherein the first end of the first connecting rod and the first end of the second connecting rod are connected by a ball hinge.

4. The floating column spoiler structure according to claim 1, wherein each of the spoiler plates comprises spoiler nets or spoiler nails.

5. The floating column spoiler structure according to claim 1, wherein a number of the lifting and unfolding assemblies corresponding to each of the spoiler plates is three, and the lifting and unfolding assemblies comprises a first lifting and unfolding assembly, a second lifting and unfolding assembly and a third lifting and unfolding assembly, and connection positions of the first lifting and unfolding assembly, the second lifting and unfolding assembly and the third lifting and unfolding assembly with corresponding one of the spoiler plates are distributed in a triangle shape.

6. The floating column spoiler structure according to claim 1, wherein the lifting gear teeth are directly arranged on the outer circumferential wall of the column, or toothed belts are arranged on the outer circumferential wall of the column, and the lifting gear teeth are located on the toothed belts.

7. A floating column, comprising a floating column spoiler structure, wherein the floating column spoiler structure comprises:

a plurality of spoiler plates;
lifting and unfolding assemblies connecting each of the spoiler plates and a column; wherein each of the lifting and unfolding assemblies comprises a first connecting rod, a second connecting rod, a first gear and a second gear; a first end of the first connecting rod is rotatably connected with a first end of the second connecting rod, and each of the spoiler plates is arranged at the first end of the first connecting rod and the first end of the second connecting rod; a second end of the first connecting rod is rotatably connected with the first gear, and a second end of the second connecting rod is rotatably connected with the second gear; the first gear and the second gear are sequentially arranged on an outer circumferential wall of the column from top to bottom along an axial direction of the column, and the outer circumferential wall of the column is provided with lifting gear teeth being capable of meshing with the first gear and the second gear.

8. The floating column according to claim 7, wherein each of the spoiler plates is rotatably arranged at the first end of the first connecting rod and the first end of the second connecting rod.

9. The floating column according to claim 7, wherein the first end of the first connecting rod and the first end of the second connecting rod are connected by a ball hinge.

10. The floating column according to claim 7, wherein each of the spoiler plates comprises spoiler nets or spoiler nails.

11. The floating column according to claim 7, wherein a number of the lifting and unfolding assemblies corresponding to each of the spoiler plates is three, and the lifting and unfolding assemblies comprises a first lifting and unfolding assembly, a second lifting and unfolding assembly and a third lifting and unfolding assembly, and connection positions of the first lifting and unfolding assembly, the second lifting and unfolding assembly and the third lifting and unfolding assembly with corresponding one of the spoiler plates are distributed in a triangle shape.

12. The floating column according to claim 7, wherein the lifting gear teeth are directly arranged on the outer circumferential wall of the column, or toothed belts are arranged on the outer circumferential wall of the column, and the lifting gear teeth are located on the toothed belts.

13. A floating wind turbine, comprising a floating column spoiler structure, wherein the floating column spoiler structure comprises:
a plurality of spoiler plates;
lifting and unfolding assemblies connecting each of the spoiler plates and a column; wherein each of the lifting and unfolding assemblies comprises a first connecting rod, a second connecting rod, a first gear and a second gear; a first end of the first connecting rod is rotatably connected with a first end of the second connecting rod, and each of the spoiler plates is arranged at the first end of the first connecting rod and the first end of the second connecting rod; a second end of the first connecting rod is rotatably connected with the first gear, and a second end of the second connecting rod is rotatably connected with the second gear; the first gear and the second gear are sequentially arranged on an outer circumferential wall of the column from top to bottom along an axial direction of the column, and the outer circumferential wall of the column is provided with lifting gear teeth being capable of meshing with the first gear and the second gear.

14. The floating wind turbine according to claim 13, wherein each of the spoiler plates is rotatably arranged at the first end of the first connecting rod and the first end of the second connecting rod.

15. The floating wind turbine according to claim 13, wherein the first end of the first connecting rod and the first end of the second connecting rod are connected by a ball hinge.

16. The floating wind turbine according to claim 13, wherein each of the spoiler plates comprises spoiler nets or spoiler nails.

\* \* \* \* \*